United States Patent
Kwon

(10) Patent No.: US 8,087,518 B2
(45) Date of Patent: Jan. 3, 2012

(54) RECTANGULAR SEDIMENTATION SYSTEM HAVING SELF-AGGREGATION FACILITY

(75) Inventor: Jung Chun Kwon, Daejeon (KR)

(73) Assignees: Ecodigm Co., Ltd., Daejeon (KR); Jung Chun Kwon, Daejeon (KR)

( * ) Notice: Subject to any disclaimer, the term of this patent is extended or adjusted under 35 U.S.C. 154(b) by 0 days.

(21) Appl. No.: 12/891,036

(22) Filed: Sep. 27, 2010

(65) Prior Publication Data

US 2011/0017653 A1   Jan. 27, 2011

Related U.S. Application Data

(63) Continuation of application No. PCT/KR2009/001506, filed on Mar. 25, 2009.

(30) Foreign Application Priority Data

Mar. 25, 2008 (KR) .................. 10-2008-0027179

(51) Int. Cl.
*B01D 21/24* (2006.01)

(52) U.S. Cl. ............... 210/519; 210/521; 210/532.1

(58) Field of Classification Search .......... 210/305, 210/519, 521, 525, 526, 527, 532.1
See application file for complete search history.

(56) References Cited

U.S. PATENT DOCUMENTS

| | | | | |
|---|---|---|---|---|
| 1,190,863 A * | 7/1916 | Corne | ............ | 210/521 |
| 2,118,157 A * | 5/1938 | Camp | ............ | 210/526 |
| 2,509,933 A * | 5/1950 | Lind | ............ | 210/526 |
| 3,221,889 A * | 12/1965 | Hirsch | ............ | 210/532.1 |
| 4,064,054 A * | 12/1977 | Anderson et al. | ............ | 210/521 |
| 5,503,747 A * | 4/1996 | Vion et al. | ............ | 210/519 |
| 5,620,600 A * | 4/1997 | Smati | ............ | 210/519 |
| 6,099,743 A * | 8/2000 | Pedersen | ............ | 210/519 |
| 7,044,308 B2 * | 5/2006 | Benson | ............ | 210/521 |
| 2005/0087480 A1 | 4/2005 | Park et al. | | |

FOREIGN PATENT DOCUMENTS

| | | |
|---|---|---|
| JP | 09-262409 A | 10/1997 |
| KR | 1020050005063 A | 1/2005 |
| KR | 1020060083172 A | 7/2006 |

OTHER PUBLICATIONS

International Search Report of PCT/KR2009/001506; mailed on Nov. 3, 2009.

* cited by examiner

*Primary Examiner* — Christopher Upton
(74) *Attorney, Agent, or Firm* — Edwards Wildman Palmer LLP; Kongsik Kim

(57) ABSTRACT

A rectangular sedimentation tank includes an upstream hopper, a downstream inclined floor, and a baffle assembly at the upstream hopper. The baffle assembly comprises: a vertical baffle with at least one upper introduction hole; a vertical screening plate; and a horizontal baffle provided between the vertical baffle and the vertical screening plate. With the tank, contaminated water can be treated cost-effectively and efficiently.

16 Claims, 11 Drawing Sheets

– Prior Art –

– Prior Art –

- Prior Art -

RECTANGULAR SEDIMENTATION SYSTEM HAVING SELF-AGGREGATION FACILITY

CROSS-REFERENCE TO RELATED APPLICATION

This is a continuation of International Application No. PCT/KR2009/001506, with an international filing date of Mar. 25, 2009, which claims the benefit of Korean Application No. 10-2008-0027179 filed Mar. 25, 2008, the entire contents of which are incorporated herein by reference.

TECHNICAL FIELD

The present invention relates to a structure of a sedimentation tank for use in treating contaminated water (waste water). More particularly, it relates to a rectangular sedimentation system having a self-aggregation facility that can induce suspended solids (SS) contained in contaminated water to be self-aggregated, thereby increasing sedimentation efficiency and overall treatment efficiency.

BACKGROUND ART

A typical apparatus for treating foul water and/or waste water includes a storage tank in which contaminated water to be treated is filled, a processing tank for purifying by using a biological method and/or a chemical method the contaminated water supplied from the storage tank, and a sedimentation tank for aggregating and sedimenting suspended solids (SS) contained in the water purified by and discharged from the processing tank such that the SS can be removed.

Since the quality of treated water primarily depends on the sedimentation performance of the sedimentation tank, it is necessary to efficiently design the sedimentation tank.

A well-known conventional sedimentation process is a gravity sedimentation process in which contaminated water is introduced in a sedimentation tank, and heavy SS is sedimented on the floor of the sedimentation tank over time according to the Strokes' Law and then removed. There are many types of sedimentation tanks that can employ such gravity sedimentation process. One of the types is an inclined plate type rectangular sedimentation tank.

FIG. 1 is a side cross-sectional view of a conventional inclined plate type rectangular sedimentation tank 10. The inclined plate type rectangular sedimentation tank 10 includes a hopper portion on an upstream side in which sludge is to be sedimented, and a floor inclination portion on a downstream side such that the (vertical) distance between the bottom of the floor of the sedimentation tank and the surface of water becomes smaller toward the downstream.

A vertical baffle 20 formed of a plurality of inlets 21 is installed in a side portion of the hopper portion so as to be perpendicular to a flow of inflowing water, which enables contaminated water to be introduced in a uniform horizontal flow and at a proper velocity.

A sludge collector 30 in a scrapper type driven by a motor M is installed in the floor inclination portion.

An outflow weir 40 is installed in an upper end portion of the downstream-side wall of the sedimentation tank.

A sludge layer formed by naturally sedimented sludge and by sludge collected by the sludge collector 30 is formed on the hopper portion and the floor inclination portion.

The conventional rectangular sedimentation tank, however, has problems. For example, it requires long sedimentation retention time to treat water with high SS density. Also, if a stream of water is deflected due to, e.g., water temperature fluctuation, sludge sedimented on the floor of the sedimentation tank may be surged to the downstream portion, thereby increasing the sludge layer toward the downstream. In addition, if the sludge is distributed on the floor of the sedimentation tank in a wide and long manner, a density of the sludge sedimented in the hopper portion becomes relatively reduced. As a consequence, the density of a return sludge may not be maintained, which may cause a problem that a microorganism density MLSS of a biological processing tank cannot be maintained.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a rectangular sedimentation tank with improved sedimentation efficiency and/or reduced maintenance costs. The tank includes a hopper portion in an upstream side and a floor inclination portion in a downstream side.

In an embodiment, the tank comprises a vertical baffle, a vertical screening plate, and a horizontal baffle.

The vertical baffle is formed at a side portion of the hopper portion and includes in the upper portion thereof at least one introduction hole for changing the flow of water introduced into the sedimentation tank.

The vertical screening plate is provided in a position corresponding to about 30 to 100% of a horizontally cross-sectional area of the top of the hopper portion. Preferably, the lower end of the vertical screening plate may be located at a position corresponding to about 60% or greater of the height (orthocenter) of water surface from the floor.

The horizontal baffle is provided between the vertical baffle and the vertical screening plate and includes a plurality of water passing holes so that the inflowing water flows vertically downward in a laminar fashion.

In certain embodiments, a short circuit prevention baffle may suitably be installed in the lower portion of the vertical baffle at an angle of 60° to 150° with respect to the vertical baffle.

In another certain embodiments, an inclination baffle may suitably be installed in a downstream position with respect to the vertical screening plate at an angle of 0 to 60° with respect to the vertical screening plate.

In these embodiments, at least one sludge moving prevention baffle may suitably be installed in the inclined floor portion of the sedimentation tank within a position corresponding to 60% or less of the upstream side of the horizontal area of the floor inclination portion.

In these embodiments, a horizontal flow maintenance baffle may suitably be installed in the floor inclination portion. The horizontal flow maintenance baffle has an upper portion including a plurality of water passing holes and a lower portion having no such water passing holes. Preferably, at least one additional horizontal flow maintenance baffle may further be provided.

According to the present invention, inflowing water having a high sludge density can be effectively processed. For example, a density of return sludge can be significantly increased. Also, sludge sedimented in the lower portion of the sedimentation basin can be prevented from moving downward, thereby providing cleaner outflow water. Further, the tank system of the present invention can be applied to not only to a new sedimentation basin but also a previously installed one, providing operation and management conveniences. Moreover, maintenance and management expenses can be reduced.

The above and other features and advantages of the present invention will be apparent from or are set forth in more detail in the accompanying drawings, which are incorporated in and form a part of this specification, and the following Detailed Description, which together serve to explain by way of example the principles of the present invention.

DETAILED DESCRIPTION OF THE DISCLOSURE

Hereinafter, the present invention will be described in detail in connection with the preferred embodiments with reference to the accompanying drawings. However, these embodiments are for illustrative purposes, and the scope of the present invention is not limited thereto. Also, it will be understood by those skilled in the art that various modifications and variations can be made to the present invention without departing from the spirit and scope of the appended claims based on the illustrative embodiments.

Figure 1:
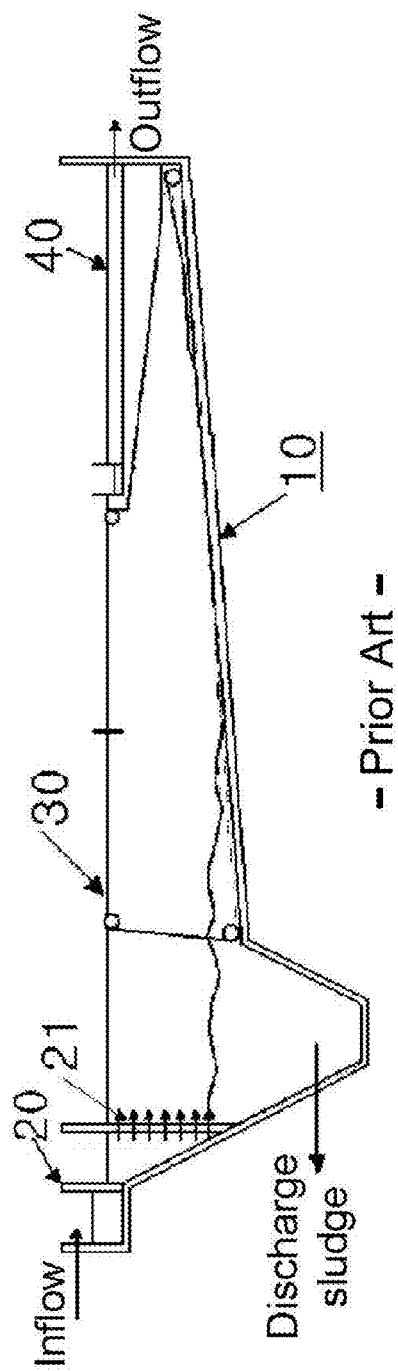
FIG. 1 is a side cross-sectional view of a conventional rectangular sedimentation tank.
Figure 2:
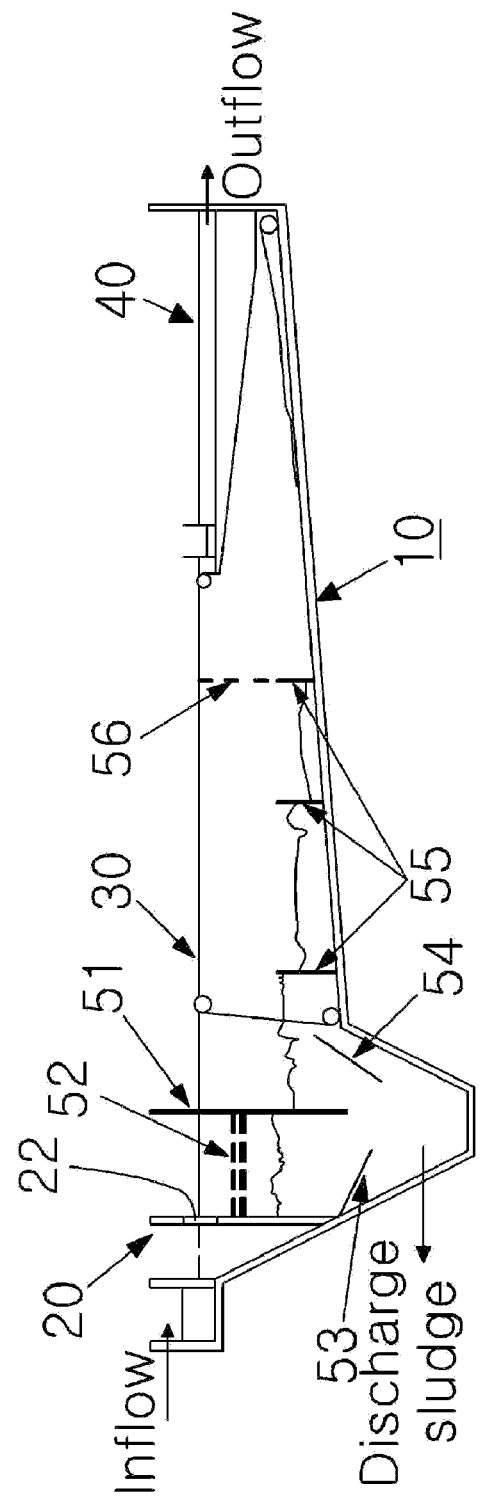
FIG. 2 is a side cross-sectional view of a rectangular sedimentation tank according to an embodiment of the present invention.
Figure 3:
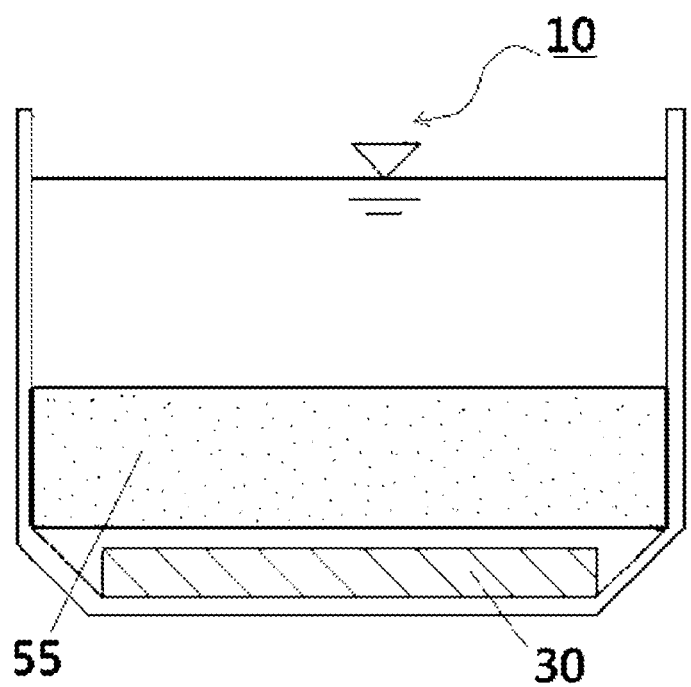
FIG. 3 is a cross-sectional view of a sludge movement screening baffle and a sludge collector of a rectangular sedimentation tank according to an embodiment of the present invention.
Figure 4:
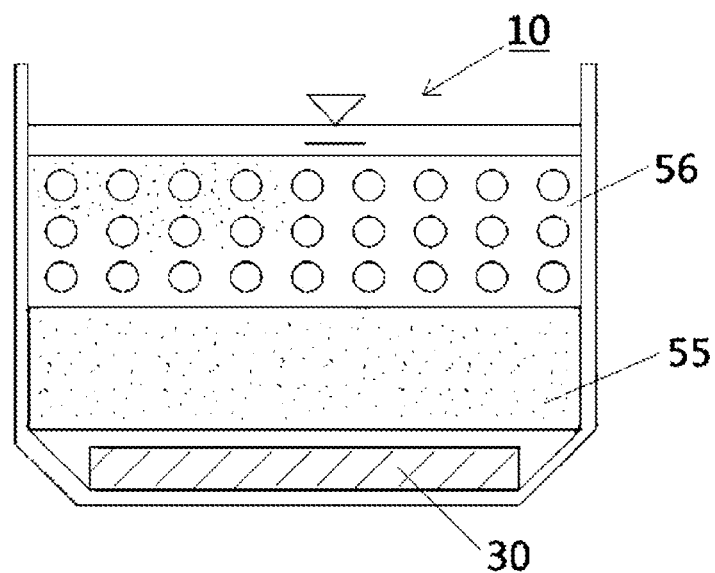
FIG. 4 is a cross-sectional view of a sludge movement screening baffle, a horizontal flow maintenance baffle, and a sludge collector of a rectangular sedimentation tank according to an embodiment of the present invention.
Figure 5:
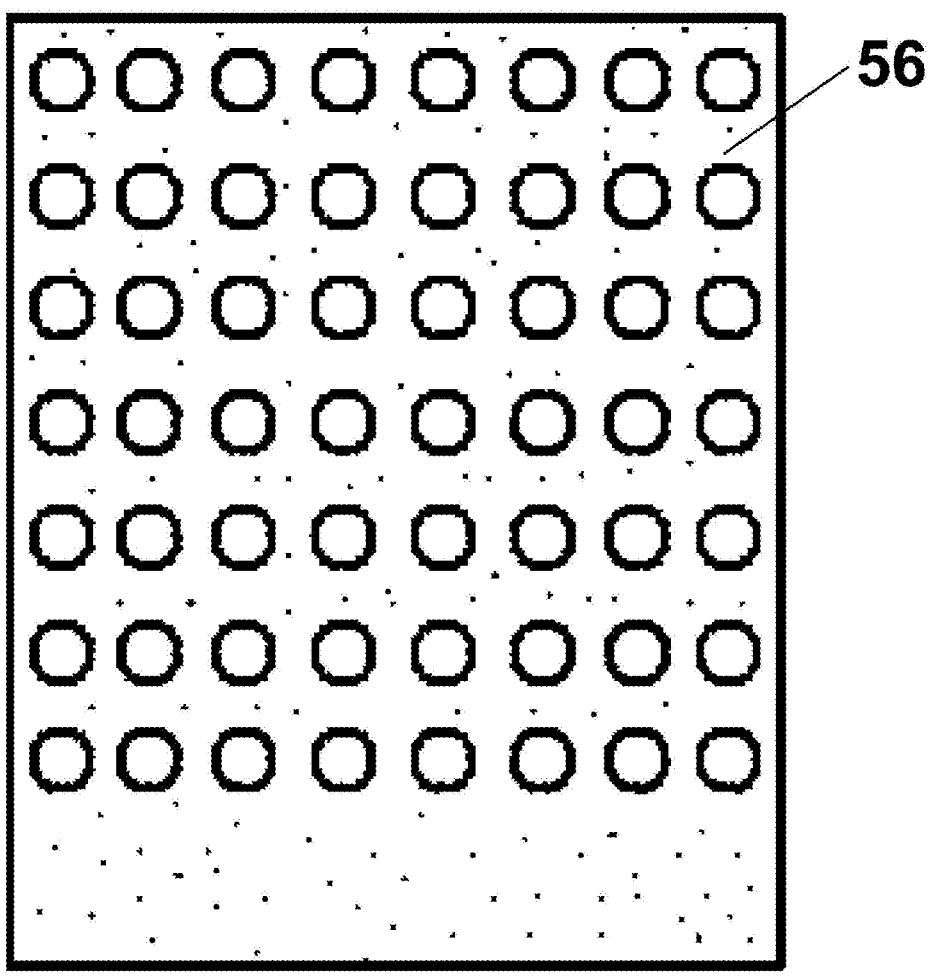
FIG. 5 is a view of a horizontal flow maintenance baffle.

FIG. 2 is a side cross-sectional view of a tank according to an embodiment of the present invention. FIG. 3 is a cross-sectional view of a sludge movement screening baffle and a sludge collector of a rectangular sedimentation tank according to an embodiment of the present invention. FIG. 4 is a cross-sectional view of a sludge movement screening baffle, a horizontal flow maintenance baffle, and a sludge collector of a rectangular sedimentation tank according to an embodiment of the present invention. FIG. 5 is a view of a horizontal flow maintenance baffle.

As discussed above, according to the conventional sedimentation tank, a vertical baffle 20 including a plurality of water passing holes is formed at a side portion of the hopper portion thereof.

In contrast, a rectangular sedimentation tank according to embodiments of the present invention, includes a vertical baffle 20, a vertical screening plate 51, and a horizontal baffle 52.

The vertical baffle 20 is formed at a side portion of the hopper portion. The vertical baffle 20 includes at least one introduction hole 22 in the upper portion thereof for changing the flow of water introduced into the sedimentation tank.

The vertical screening plate 51 is provided to be spaced from the vertical baffle by a predetermined distance such that the upper end of the vertical screening plate 51 is or can be adjusted to be higher than the surface of water.

The horizontal baffle 52 is provided between the vertical baffle 20 and the vertical screening plate 51. The horizontal baffle 52 includes a plurality of water passing holes so that the inflowing water flows vertically downward in a laminar fashion. In some embodiments, at least one additional horizontal baffle 52 can be provided.

The vertical screening plate 51 is provided in a position. According to certain embodiments of the present invention, the vertical screening plate 51 is located in a position that is about 30 to 100% of the horizontally cross-sectional area of the top of the hopper portion.

For instance, in case of a sedimentation tank which has overall retention time of 3 to 5 hours, the vertical screening plate 51 may be provided in a position corresponding to a retention time of 3 to 30 minutes, preferably 5 to 10 minutes.

If the vertical screening plate 51 is located in a position where a horizontally cross-sectional area of the hopper portion is less than 30% (e.g., less than 3 minutes of retention time in case of 3-5 hours of overall retention time), sludge sedimentation may not be made sufficiently. On the other hand, if the vertical screening plate 51 is located in a position where a horizontally cross-sectional area of the hopper portion is greater than 100% (e.g., greater than 30 minutes of retention time in case of 3-5 hours of overall retention time), since the downstream space with respect to the vertical screening plate 51 becomes smaller, a flow of the processed water may be disturbed, thereby resulting in sludge floating.

In addition, the lower end of the vertical screening plate 51 is provided in a predetermined position. In some embodiments, the lower end of the vertical screening plate 51 is located between a position to be spaced from the floor of the sedimentation tank by approximately 20 cm and a position equal to 60% or less of the height of the water surface from the floor.

If the lower end of the vertical screening plate 51 is located at a position which is less than 20 cm from the floor, the flow of the processed water may be disturbed, thereby resulting in sludge floating. On the other hand, if the lower end of the vertical screening plate 51 is located at a position whish is greater than 60% of the height of the water surface from the floor, since the retention time of the processed water becomes shorter, the sludge aggregation and sedimentation may not be made sufficiently.

As described above, when the vertical screening plate 51 is located in a predetermined position horizontally and vertically, the sedimentation effect may be increased and/or maximized.

The velocity of a downward stream or a flux per length with respect to the vertical screening plate 51 can be adjusted and selected suitably to maintain aggregated sludge and improve sedimentation efficiency according to specific designs of sedimentation tanks in accordance with the present invention. Preferably, for example, it can be less than, e.g., 3 m$^3$/min.

In certain embodiments of the present invention, a short circuit prevention baffle 53 may be installed in the lower end of the vertical baffle 20 at an angle of 60° to 150° with respect to the vertical baffle.

When return sludge and surplus sludge are discharged, short circuit of sludge can occur. The short circuit prevention baffle 53 is provide to prevent such short circuit and maintain high sludge density (e.g., 5000 mg/L or higher).

If the short circuit prevention baffle 53 is installed at an angle not within the range of 60° to 150°, short circuit may increase or short circuit prevention may not be sufficient.

In some other embodiments, an inclined baffle 54 may be provided at a downstream position with regard to the vertical screening plate 51 at an angle of 0 to 60° with respect to the vertical screening plate 51. The inclined baffle 54 functions to prevent sludge sedimented between the vertical baffle 20 and the vertical screening plate 51 from moving downstream of the sedimentation tank, and stably maintain a sludge layer so as to increase densities of the return and surplus sludges.

The sedimented sludge moves toward an outflow weir or moves to a hopper of an introduction portion by the sludge collector 30. In this regard, if the sedimentation tank is long, it takes long time for the sludge to move, which may cause the sedimented sludge to float due to an action of microorganism such as denitrification, and may cause the quality of outflow water to be degraded. To prevent the problem(s), in some embodiments, at least one sludge moving prevention baffle 55 may be installed in the floor inclined portion of the sedimentation tank as shown in FIG. 2.

FIGS. 3 and 4 show examples of the relative position and structure of the sludge moving prevention baffle 55. As shown in FIGS. 3 and 4, at least one sludge moving prevention baffle 55 may be installed in the inclined floor portion of the sedimentation tank within a position corresponding to 60% or less of the upstream side of the horizontal area of the floor inclination portion such that the lower end of the sludge moving prevention baffle 55 is spaced from the floor of the inclination portion by a predetermined distance (e.g., 20 to 100 cm). If the lower end of the sludge moving prevention baffle 55 is spaced from the floor of the inclination portion too much, the efficiency of the sludge moving prevention baffle 55 may be reduced. On the other hand, if the lower end of the sludge moving prevention baffle 55 is spaced from the floor of the inclination portion too little, it may negatively affect the movement of the sludge collector 30. Preferably, ½ or less of water surface from the floor may be screened.

If the sludge moving prevention baffle 55 is installed in the inclined floor portion of the sedimentation tank not within a position corresponding to 60% or less of the upstream side of the horizontal area of the floor inclination portion, since the velocity of water in the upper portion becomes higher, a sludge loss may increase, thereby degrading the quality of discharged water.

In certain embodiments, as shown in FIGS. 2, 4, 5, and 11, at least one vertical baffle 56 for horizontal flow maintenance (hereinafter, horizontal flow maintenance baffle) may be further installed downstream of the vertical screening plate 51. As shown in the drawings, the middle portion and the upper portion of the horizontal flow maintenance baffle 56 may have a plurality of holes through which water can pass. The lower portion of the horizontal flow maintenance baffle 56 may have no such holes. The portion(s) of the horizontal flow maintenance baffle 56 that does not have such holes prevents the sludge from moving downward and the portion(s) thereof that has such holes maintains the stream of water to be laminar flow.

In certain embodiments, one or more additional (second) horizontal flow maintenance baffle may further be provided.

Preferably, the lower end of the horizontal flow maintenance baffle 56 (and the lower end of the additional horizontal flow maintenance baffle) may be spaced apart from the floor by a predetermined distance (e.g., 20 to 100 cm). The upper end thereof may be spaced from the water surface by a distance that is 40% or greater of the distance (orthocenter) between the bottom of the floor where the horizontal flow maintenance baffle 56 is located and the water surface above the bottom of the floor. The upper portion thereof may have a plurality of water passing holes in order to prevent the sludge from moving downward and maintain the stream of water flowing upward in a laminar fashion

EXAMPLES

The present invention will now be in more detail described in the numerical analysis example below.

A computing turbulence analysis was carried out to understand variations of a turbulent flow in the sedimentation tank according to the present embodiment.

The specification and the operating condition used for the analysis is listed in Table 1.

TABLE 1

| Item | Condition | Remark |
|---|---|---|
| Flux | 300,000 ton/day | Analysis program,: Fluent 6.2 |
| Size of sedimentation basin | 7.4 mW × 60 mL × 2.6 mH × 16 basin | |
| Flux of one basin | 18.750 ton/day | |

Figure 6:
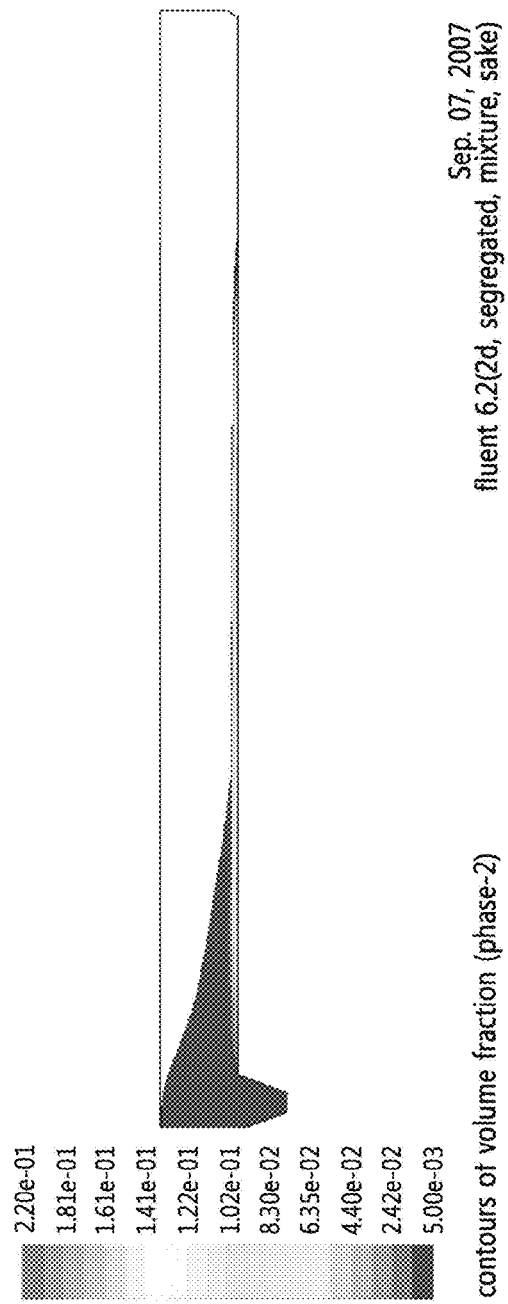
FIG. 6 shows a computing simulation of sludge movement in a conventional rectangular sedimentation tank.
Figure 7:
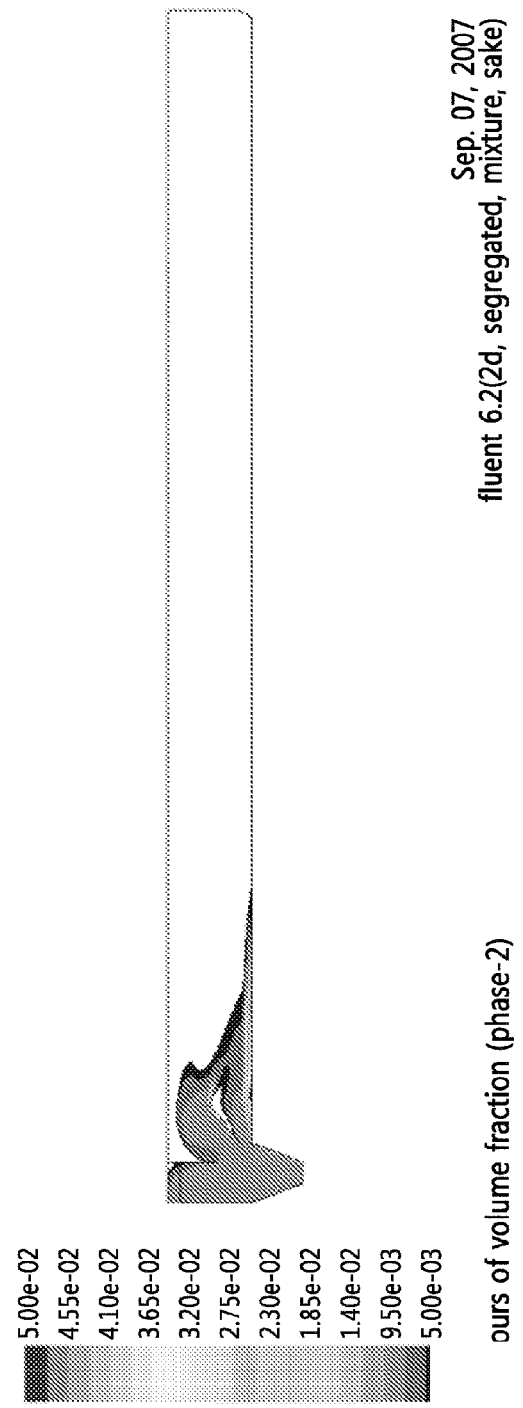
FIG. 7 shows a computing simulation of sludge movement in a rectangular sedimentation tank according to an embodiment of the present invention, in which a sludge movement screening baffle is not included.
Figure 8:
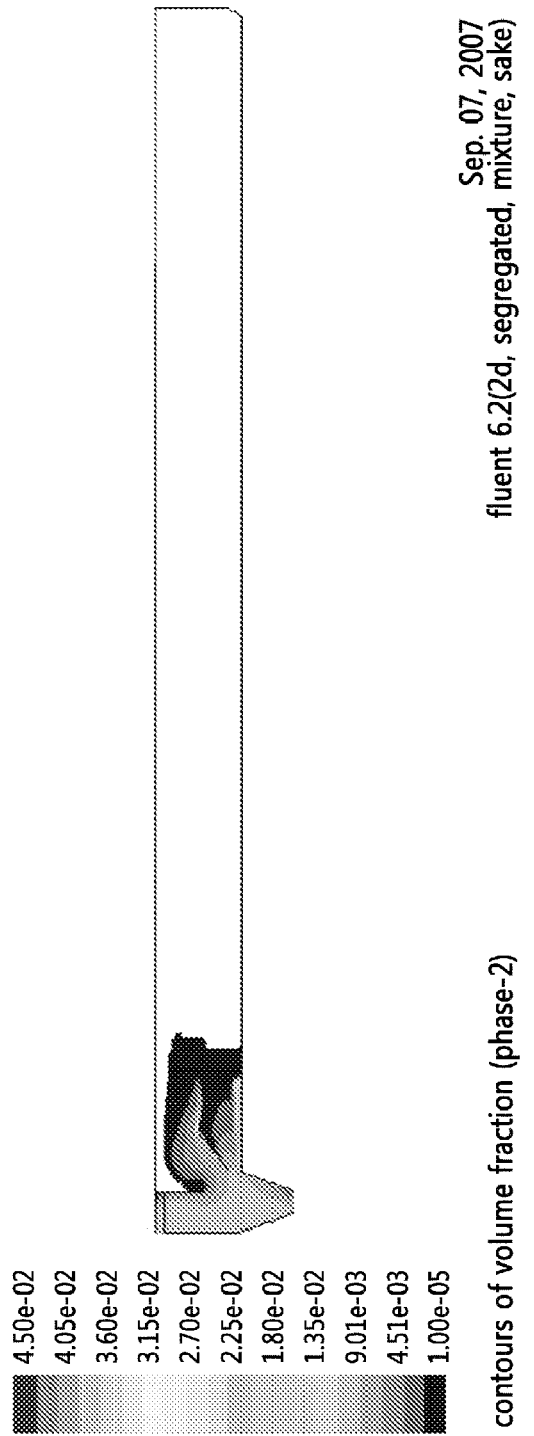
FIG. 8 shows a computing simulation of sludge movement in a rectangular sedimentation tank according to an embodiment of the present invention, in which a sludge movement screening baffle is included.

FIG. 6 shows a computing simulation of sludge movement (i.e., density of sludge according to position) in a conventional rectangular sedimentation tank. FIG. 7 shows a computing simulation of sludge movement in a rectangular sedimentation tanks according to an embodiment of the present invention, in which a sludge movement prevention baffle is not included. FIG. 8 shows a computing simulation of sludge movement in a rectangular sedimentation tank according to an embodiment of the present invention, in which a sludge movement prevention baffle is included.

The conventional rectangular sedimentation tank (FIG. 6) shows a high density of sludge from an introduction hole to a region far away therefrom, whereas the rectangular sedimentation system of the present invention (FIGS. 7 and 8) show that the sludge is mainly sedimented around an introduction hole and a hopper portion.

Figure 9:
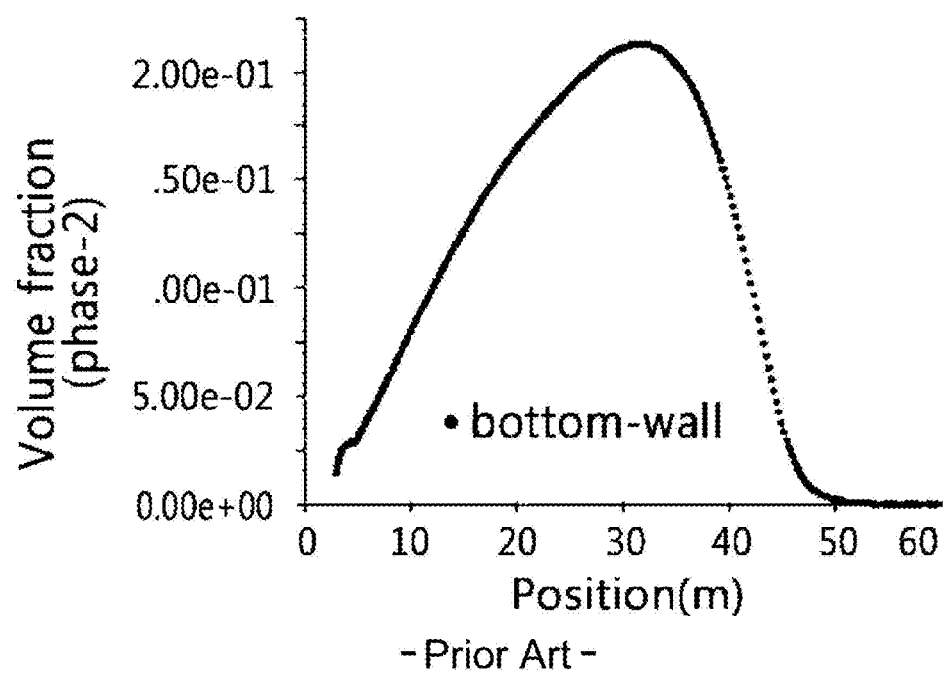
FIG. 9 is a graph of a sludge density distribution on a floor surface of a conventional rectangular sedimentation tank.
Figure 10:
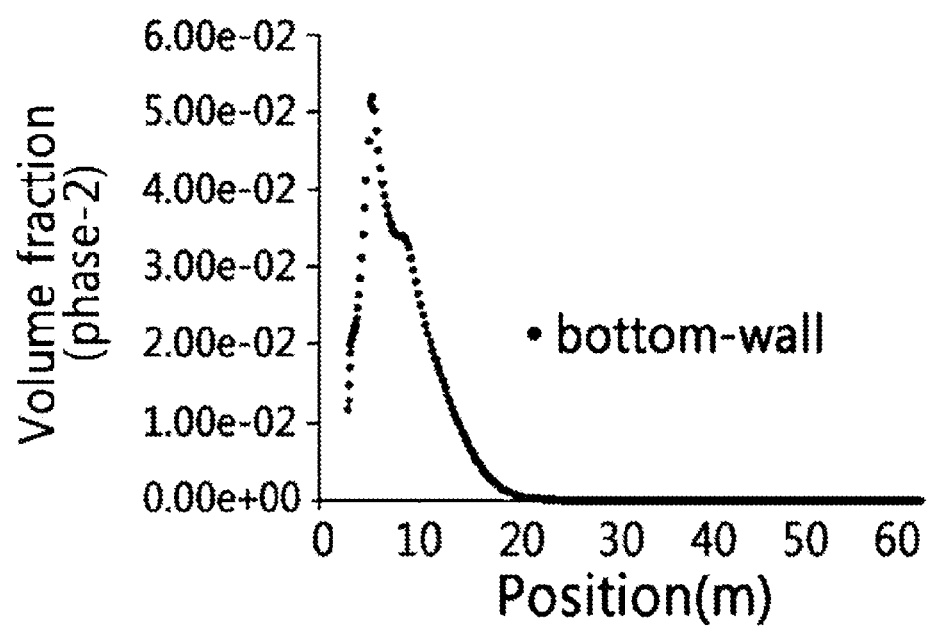
FIG. 10 is a graph of a sludge density distribution on a floor surface of a rectangular sedimentation tank according to an embodiment of the present invention.
Figure 11:
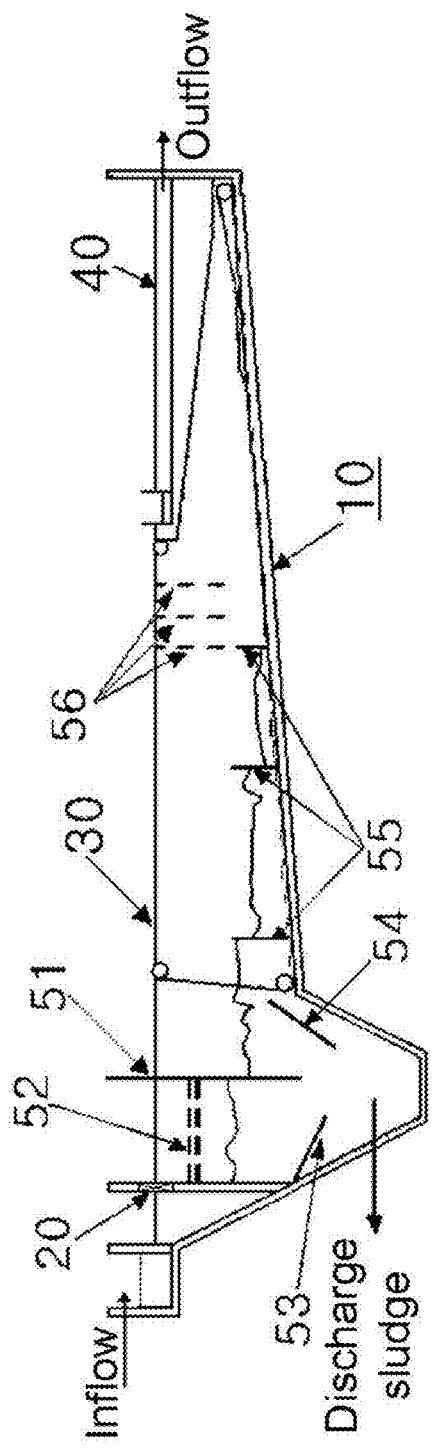
FIG. 11 is a side cross-sectional view of a rectangular sedimentation tank according to an embodiment of the present invention, in which multiple horizontal flow maintenance baffles are installed.

FIGS. 9 and 10 are graphs of a sludge density distribution on a floor surface of a conventional rectangular sedimentation tank and a rectangular sedimentation tank according to an embodiment of the present invention, respectively. The conventional sedimentation tank (FIG. 9) shows a high density of sludge at a position of 30 m of the floor surface, whereas the rectangular sedimentation tank of the present invention (FIG. 10) shows a high density of sludge at a position of 8 m of the floor surface. It is thus confirmed that a moving distance of sludge is very short in the rectangular sedimentation tank.

As described above, with rectangular sedimentation tanks of the present invention, it is possible to efficiently process inflowing water having a high density of suspended solids (SS). It is also possible to increase a density of return sludge, thereby increasing the sedimentation efficiency and providing cleaner outflow water. Further, it is possible to operate and manage the process more conveniently and cost-effectively, compared to conventional rectangular sedimentation tanks.

The invention claimed is:

1. A rectangular sedimentation tank comprising:
   an upstream hopper;
   a downstream inclined floor; and
   a baffle assembly at the hopper, the baffle assembly comprising:
      a vertical baffle having at least one introduction hole;
      a vertical screening plate downstream of the vertical baffle; and
      a horizontal baffle provided between the vertical baffle and the vertical screening plate, the horizontal baffle having a plurality of water passing holes.

2. The tank of claim 1, wherein a short circuit prevention baffle is installed in a lower portion of the vertical baffle at an angle of 60° to 150° with respect to the vertical baffle.

3. The tank of claim 2, wherein at least one sludge moving prevention baffle is installed in the downstream inclined floor.

4. The tank of claim 2, further comprising a baffle for horizontal flow maintenance having a plurality of water passing holes at an upper portion thereof and having no such water passing holes at a lower portion thereof.

5. The tank of claim 4, further comprising at least one additional baffle for horizontal flow maintenance baffle.

6. The tank of claim 2, wherein the lower end of the vertical screening plate is spaced apart from the downstream inclined floor by a predetermined length.

7. The tank of claim 1, wherein an inclination baffle is installed in a position downstream of the vertical screening plate at an angle of 0 to 60° with respect to the vertical screening plate.

8. The tank of claim 7, wherein at least one sludge moving prevention baffle is installed in the downstream inclined floor.

9. The tank of claim 7, further comprising a baffle for horizontal flow maintenance having a plurality of water passing holes at an upper portion thereof and having no such water passing holes at a lower portion thereof.

10. The tank of claim 9, further comprising at least one additional baffle for horizontal flow maintenance.

11. The tank of claim 7, wherein the lower end of the vertical screening plate is spaced apart from the downstream inclined floor by a predetermined length.

12. The tank of claim 1, wherein at least one sludge moving prevention baffle is installed in the downstream inclined floor.

13. The tank of claim 1, further comprising a baffle for horizontal flow maintenance having a plurality of water passing holes at an upper portion thereof and having no such water passing holes at a lower portion thereof.

14. The tank of claim 13, further comprising at least one additional baffle for horizontal flow maintenance.

15. The tank of claim 1, wherein the lower end of the vertical screening plate is spaced apart from the downstream inclined floor by a predetermined length.

16. The tank of claim 1, wherein the horizontal baffle is located below the introduction hole or holes of the vertical baffle.

* * * * *